United States Patent [19]
Weatherholt

[11] Patent Number: 4,492,113
[45] Date of Patent: Jan. 8, 1985

[54] METHOD AND APPARATUS FOR CLEANING AND TESTING HEAT EXCHANGERS

[76] Inventor: Philip Weatherholt, E. College St., P.O. Box 265, Rio Grande, Ohio 45674

[21] Appl. No.: 448,459

[22] Filed: Dec. 10, 1982

[51] Int. Cl.³ .................................... G01M 15/00
[52] U.S. Cl. ................................ 73/118; 165/95; 73/168
[58] Field of Search .............. 73/168, 756, 118, 49.7; 138/104; 134/95, 98, 17; 15/104.08; 165/95

[56] References Cited

U.S. PATENT DOCUMENTS

| | | | |
|---|---|---|---|
| 1,034,301 | 7/1912 | Redeker | 134/17 |
| 3,034,521 | 4/1960 | Greenfield | 165/95 X |
| 3,296,854 | 1/1967 | Morgan | 73/168 X |
| 4,235,100 | 11/1980 | Branchini | 73/49.7 |

Primary Examiner—John W. Caldwell, Sr.
Assistant Examiner—Ellwood G. Harding, Jr.
Attorney, Agent, or Firm—John L. Gray

[57] ABSTRACT

An economical compact heat exchanger cleaning and testing device and a method of cleaning and testing heat exchangers using said device is disclosed. The device involves a T-shaped fitting, one end of the top portion of the "T" being adapted to be connected to a source of water under pressure and the other end being adapted to be connected to the hose leading to the heat exchanger. The other leg of the "T" is adapted to be connected to a source of air pressure and contains both an air pressure gauge and a modulating valve. By introducing water under pressure and alternately increasing and decreasing the air pressure, a shock wave is produced which tends to remove any accumulated scale in the heat exchanger. After the heat exchanger has been completely cleaned the heat exchanger can be filled with water under pressure and the air pressure can be increased up to a measured pressure to determine whether or not there are any leaks in the system.

8 Claims, 3 Drawing Figures

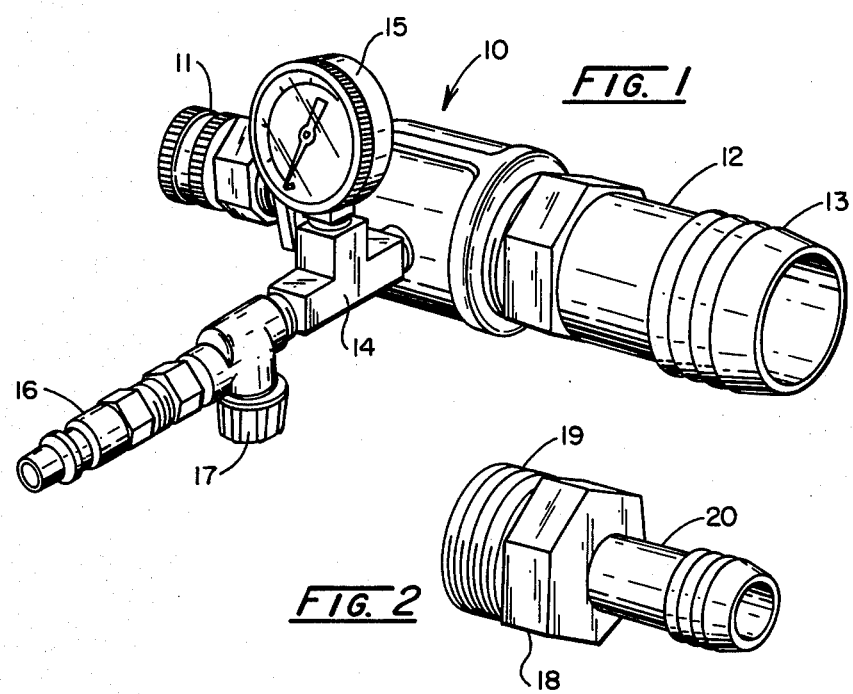
FIG. 1
FIG. 2
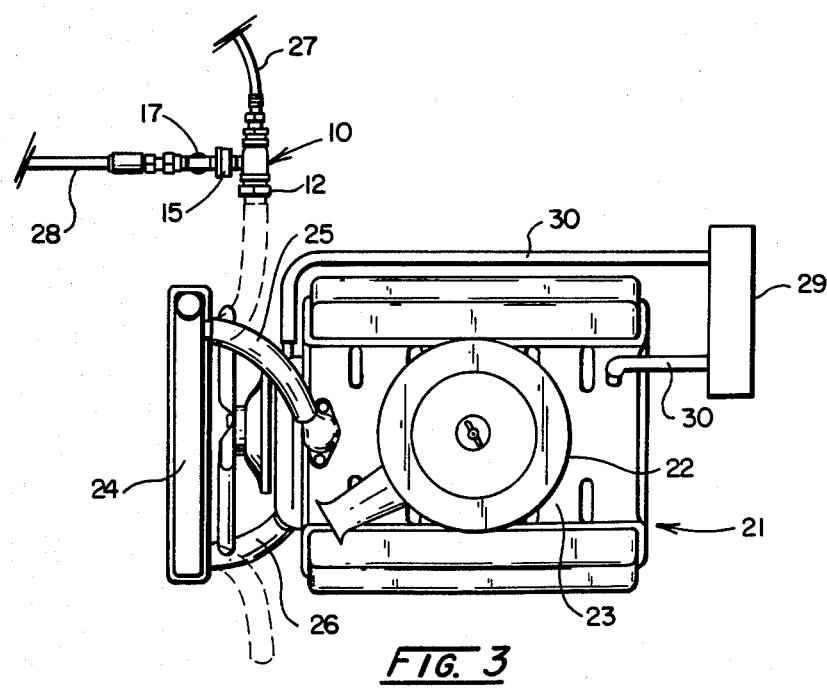
FIG. 3

METHOD AND APPARATUS FOR CLEANING AND TESTING HEAT EXCHANGERS

BACKGROUND OF THE INVENTION

Use of water and air under pressure to loosen scale and clean the interior of a heat exchanger has been used in the past. Attention is called to U.S. Pat. No. 1,034,301, Redeker, which uses gas at high pressure; U.S. Pat. No. 1,840,834, Davis, Jr., which uses a pulsating pressure system; U.S. Pat. No. 1,908,954, Carmin, which utilizes air under pressure; U.S. Pat. No. 2,222,516, Powell, et al., which uses air for turbulence; U.S. Pat. No. 2,510,701, Cross, which utilizes air and water together; U.S. Pat. No. 2,681,657, Griffith, Jr., which uses air, steam and water; and U.S. Pat. No. 3,350,223, Monteath, Jr., which uses a mixture of air and water under pressure. All of these prior art devices, however, involve complicated expensive equipment systems and those that are on the market cost in excess of $200.00 for heat exchange cleaning purposes. Moreover, none of these systems include a simple means to test the system for leaks once the system has been cleaned.

SUMMARY OF THE INVENTION

This invention relates to a simple device and method for cleaning heat exchangers which utilizes a combination of water under pressure and manually controlled varying amounts of air added thereto to produce a discontinuous shock treatment to loosen scale and help clean the interior of the heat exchanger.

Furthermore, the device embodies a pressure measuring device so that the unit may be used to check the heat exchanger for leaks following the cleaning operation.

It is therefore an object of this invention to provide an economical, portable, combination cleaning and testing device for a heat exchanger.

It is a further object of this invention to provide a method of cleaning and testing a heat exchanger.

This, together with other objects and advantages of the invention, should become apparent in the details of construction and operation as more fully described hereinafter and claimed, reference being had to the accompanying drawings forming a part hereof wherein like numerals refer to like parts throughout.

BRIEF DESCRIPTION OF THE DRAWINGS

FIG. 1 is a perspective view of the combination heat exchanger cleaning and testing device.

FIG. 2 is a fitting which may be utilized with the device for use in connecting it to smaller sized heat exchangers.

FIG. 3 is a plan view showing the device in use connected to the radiator hose of an automobile internal combustion engine.

DETAILED DESCRIPTION OF THE INVENTION

Referring now to FIG. 1, the hollow T-shaped device is shown generally at 10. It is provided at one end of the top of the "T" with a connection 11 which is adapted to be screwed on and thus connected to a water hose. Connection 12 at the opposite end of the top of the "T" is of a size to fit the hose of an automobile engine radiator and the hose may be slipped over the ridges 13—13 thus effectively preventing water from leaking outwardly. An air pipe 14 is connected in the middle of the device 10 and forms the upright portion of the "T". It is provided with an air pressure gauge 15 and a conventional fitting 16 adapted to be connected to a hose connected to an air compressor. Variable valve 17 is provided to enable the air pressure to be modulated and also to close the system off completely.

Referring now to FIG. 2, there is shown a fitting 18 provided with a portion 19 which may be screwed into device 10 in place of fitting 12. Fitting 18 is provided with a smaller diameter section 20 adapted to be connected to a smaller diameter hose such as the heater hose in an automobile engine.

Referring now to FIG. 3, a conventional automobile internal combustion engine is shown generally at 21 and is provided with a conventional air cleaner 22 and the engine block portion 23 is shown connected to the radiator 24 by means of radiator hose 25 through which water flows from the engine block 23 to the radiator 24. The radiator 24 is also connected at its base through hose 26 to the lower portion of the engine block 23. The upper and lower hoses 25 and 26 may be disconnected from the engine block 23 and the combination cleaning and testing device 10 may be connected to either of these hoses. Device 10 is shown connected to the upper hose 25 and is also connected to a water hose 27 under pressure and to an air hose 28 also under pressure. Also shown is the heater 29 which is connected by means of hoses 30—30 to the engine block.

In operation, utilizing a conventional internal combustion engine of a motor vehicle, the combination heat exchange cleaner and testing device 10 is attached to hose 25 which is disconnected from the engine block 23 but remains connected to the upper portion of the radiator 24 and the lower hose 26 is also disconnected from the engine block. The position of these disconnected hoses is shown in dotted outline. The water in water hose 27 is then turned on and the air pressure valve 17 is alternately turned on and off so as to send vibratory shock waves through the system while water is flowing therethrough. The result is to thoroughly clean the system and to remove any loose scale therein. After this has been accomplished, hose 26 may be reconnected to the engine block 23 and the procedure may be repeated so as to thoroughly clean out the engine block 23 also with water under pressure flowing through hose 27 and the air pressure being alternately turned on and off by means of valve 17.

If desired, hoses 25 and 26 can be disconnected from the radiator and hose 25 or hose 26 can be connected to the combination cleaner and testing device 10 at end 12 so as to only clean out the engine block 23. In large installations sometimes this is the preferred technique. Again, the water flows continuously under pressure with the air being turned on and off manually by means of valve 17. Likewise, the heater 29 may be cleaned in conjunction with the cleaning of the engine block 23 or the cleaning of the engine block 23 and the radiator 24 or, if desired, the heater 29 may be cleaned separately by disconnecting hoses 30—30 from the engine block 23, replacing fitting 12 on the combination cleaner and testing device 10 with fitting 19 so as to provide a portion 20 which is adapted to fit hoses 30—30.

After all three units have been thoroughly cleaned, the hoses are reconnected leaving hose 25 connected to the combination cleaner and tester 10 and closing the opening of the engine block 23 where hose 25 would normally be connected to it. The system is then filled with water, closed, and air pressure is added to the system until an appropriate pressure is reached on the gauge 15. This pressure is usually from 9 psi to 17 psi, as determined by the rating of the pressure cap being used on the system. The system is thus checked to determine whether or not there are any leaks. If there are none, the hose 25 is disconnected from device 10 and reconnected to the engine block 23.

Thus it will be seen that a simple, portable, and economical combination heat exchange cleaning and testing device has been provided which may be used to clean and test the heat exchange system in an internal combustion engine and may also be used for other heat exchangers.

While this invention has been described in its preferred embodiment, it is appreciated that variations thereon may be made without departing from the proper scope and spirit of the invention.

What is claimed is:

1. A combination cleaning and static testing device for a heat exchanger, said cleaning and testing device being generally in the shape of a "T", the top portion of said T-shaped portion of said device being hollow and tubular in shape and being provided with water source connecting means at one end for connecting said device to an external source of water and the other end of said T-shaped portion of said device being provided with heat exchanger connecting means for connecting said device to a heat exchanger, a hollow tubular portion constituting the single leg of the T-shaped portion being connected to the hollow tubular top portion of said T-shaped portion and being provided at its open end with air source connecting means capable of connecting said device to a source of air under pressure, said single leg of said T-shaped portion connecting means containing a shut-off and variable pressure air control valve for modulating and closing off the flow of air into said testing device and also containing between said air flow modulating and closure means and the hollow tubular top portion of said T-shaped portion, means for measuring the pressure in said device.

2. The device of claim 1 wherein said heat exchange connecting means for connecting said device to a heat exchanger may be removed from the remainder of said device and replaced with means having different sized openings therein.

3. The device of claim 1 wherein said water source connecting means for connecting said device to a source of water comprises a screw-on fitting for a water hose.

4. The device of claim 1 wherein said heat exchanger connecting means for connecting said device to a heat exchanger comprises a friction-type mechanical sealer over which a hose connected to said heat exchanger may be attached.

5. The device of claim 1 wherein said air source connecting means for connecting said device to a source of air under pressure constitutes a fitting adaptable to be frictionally connected to a conventional air pressure hose.

6. The device of claim 1 wherein said air flow modulating and closure means for modulating and closing off the flow of air is a throttle valve which may be completely closed.

7. The device of claim 1 wherein said means for measuring the pressure in the device is a pressure gauge.

8. A method of cleaning and static testing a heat exchanger which comprises attaching to one end of said heat exchanger a source of water under pressure and providing an exit opening for said water from the other end of said heat exchanger and causing said water to flow through said heat exchanger, introducing air under pressure between said heat exchanger and said source of water under pressure, turning said air on and off repeatedly and varying the pressure of said air so as to effect a series of vibratory shocks and a modulation of air flow in said heat exchanger until the water exiting from said heat exchanger is sufficiently clean, closing the exit from said heat exchanger, filling said heat exchanger with water, turning on the air to a predesignated pressure reading, and checking said heat exchanger for leaks.

* * * * *